(12) United States Patent
Juels et al.

(10) Patent No.: US 9,037,858 B1
(45) Date of Patent: May 19, 2015

(54) DISTRIBUTED CRYPTOGRAPHY USING DISTINCT VALUE SETS EACH COMPRISING AT LEAST ONE OBSCURED SECRET VALUE

(71) Applicant: EMC Corporation, Hopkinton, MA (US)

(72) Inventors: Ari Juels, Brookline, MA (US); Sandra Carielli, Acton, MA (US); Kevin D. Bowers, Melrose, MA (US); Guoying Luo, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 92 days.

(21) Appl. No.: 13/795,801

(22) Filed: Mar. 12, 2013

(51) Int. Cl.
*H04L 29/06* (2006.01)
*G06F 21/00* (2013.01)

(52) U.S. Cl.
CPC ...................................... *H04L 63/08* (2013.01)

(58) Field of Classification Search
CPC ... H04L 63/08; H04L 63/0428; H04L 63/083; H04L 63/10; G06F 21/30
See application file for complete search history.

(56) References Cited

U.S. PATENT DOCUMENTS

2007/0044143 A1* 2/2007 Zhu et al. ........................... 726/8
2010/0251347 A1* 9/2010 Roskind ............................. 726/5

OTHER PUBLICATIONS

"The MIT Kerberos Consortium," http://www.kerberos.org/, 2007, 3 pages.

"RSA Distributed Credential Protection," http://www.emc.com/security/rsa-distributed-credential-protection.htm, 2013, 2 pages.
C. Barral et al., "Externalized Fingerprint Matching," Lecture Notes in Computer Science (LNCS), 2004, pp. 309-315, vol. 3072.
J, Brainard et al., "A New Two-Server Approach for Authentication with Short Secrets," 12th USENIX Security Symposium, Aug. 2003, pp. 201-214.
J. Camenisch et al., "Practical Yet Universally Composable Two-Server Password-Authenticated Secret Sharing," ACM Conference on Computer and Communications Security (CCS), Oct. 2012, pp. 525-536.
R.J. Hulsebosch et al., "Context Sensitive Access Control," Tenth ACM Symposium on Access Control Models and Technologies (SACMAT), 2005, pp. 111-119.
A. Juels et al., "A Fuzzy Vault Scheme," Designs, Codes and Cryptography, Feb. 2006, pp. 237-257, vol. 38, No. 2.
M. Lehtonen et al., "Probabilistic Approach for Location-Based Authentication," 1st International Workshop on Security for Spontaneous Interaction (IWSSI), Sep. 2007, 6 pages.

(Continued)

*Primary Examiner* — Izunna Okeke
(74) *Attorney, Agent, or Firm* — Ryan, Mason & Lewis, LLP

(57) ABSTRACT

An authentication system comprises multiple servers and a controller coupled to or otherwise associated with the servers. The controller is configured to control storage in the servers of respective chaff sets or other types of value sets, each including at least one secret value obscured within a distinct arrangement of other values. Each of the servers comprises a local verifier configured to generate an indication as to whether or not a received input value corresponds to one of the values in its value set. The controller comprises a global verifier configured to authenticate the received input value based on the indications generated by at least a subset of the servers. By way of example, the secret value may comprise a common value which is the same for all of the value sets, with the value sets otherwise including distinct values such that their intersection yields only the common value.

30 Claims, 3 Drawing Sheets

(56) References Cited

OTHER PUBLICATIONS

Helger Lipmaa, "Multiparty Computations (bibliography)," http://bit.ly/ShOvkL, 1997-2009, 4 pages.

Ralph C. Merkle, "Secure Communications Over Insecure Channels," Communications of the ACM, Apr. 1978, pp. 294-299, vol. 21, No. 4.

C. Neuman et al., "The Kerberos Network Authentication Service (V5)," Network Working Group, Request for Comments: 4120, Jul. 2005, 138 pages.

Ronald L. Rivest, "Chaffing and Winnowing: Confidentiality Without Encryption," CryptoBytes (RSA Laboratories), Jul. 1998, pp. 12-17, vol. 4, No. 1.

M. Szydlo et al., "Proofs for Two-Server Password Authentication," The Cryptographers' Track at the RSA Conference, Topics in Cryptology—CT-RSA, Feb. 2005, pp. 227-244.

* cited by examiner

DISTRIBUTED CRYPTOGRAPHY USING DISTINCT VALUE SETS EACH COMPRISING AT LEAST ONE OBSCURED SECRET VALUE

FIELD

The field relates generally to cryptography, and more particularly to distributed cryptography.

BACKGROUND

Numerous conventional authentication systems make use of distributed cryptography arrangements. For example, in a typical distributed cryptography arrangement, a secret value is stored in a distributed manner across multiple servers instead of being stored in its entirety on a single server, as a basic defense against compromise of the single server. Efficient distributed cryptographic protocols are known for use in these and other settings, including protocols for operations such as digital signing, key generation, encryption and decryption.

Most of these known distributed cryptographic protocols rely on homomorphic properties inherent in public-key cryptographic primitives, which generally allow partial operations executed with individual key shares to be combined to achieve an operation with a complete private key.

However, many authentication systems require verification of secret values that are constructed using symmetric-key primitives. These include, for example, password-based Kerberos authentication and one-time passcode authentication. Efficient execution of standard symmetric-key primitives typically requires that at least one server or other participating distributed entity have full knowledge of the corresponding key. For example, to encrypt a message m under symmetric key κ using the Advanced Encryption Standard (AES), a participating distributed entity must know both κ and m. Accordingly, verification of a secret value derived using symmetric-key operations would appear to expose one or more of the distributed entities to potential compromise.

Although fully distributed verification of a secret value based purely on symmetric-key operations is possible using security multiparty computation techniques, these techniques require excessive bandwidth and computational resources.

SUMMARY

Illustrative embodiments of the present invention provide improved distributed cryptography techniques that are particularly well-suited for use in symmetric-key authentication applications. These embodiments involve storing in multiple servers distinct chaff sets or other types of value sets each of which includes one or more obscured secret values.

Arrangements of this type can advantageously eliminate situations in which a server or other distributed entity is exposed to potential compromise, while also avoiding the excessive bandwidth and computational requirements associated with security multiparty computation techniques.

In one embodiment, an authentication system comprises a plurality of servers and a controller coupled to or otherwise associated with the servers. The controller is configured to control storage in the servers of respective value sets each including at least one secret value obscured within a distinct arrangement of other values. Each of the servers comprises a local verifier configured to generate an indication as to whether or not a received input value corresponds to one of the values in its value set. The controller comprises a global verifier configured to authenticate the received input value based on the indications generated by at least a subset of the servers.

By way of example, the secret value may comprise a common value which is the same for all of the value sets, with the value sets otherwise including distinct values such that their intersection yields only the common value.

Embodiments of the invention can be implemented in a wide variety of different cryptographic applications, including, for example, symmetric-key authentication applications such as password verification, password-based Kerberos authentication, verification of one-time passcodes (OTPs), biometric authentication and behavioral profiling.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides techniques for distributed cryptography using chaff sets or other distinct value sets each of which obscures at least one secret value within that set. Such techniques may be utilized, by way of example, in various symmetric-key authentication applications such as password verification, password-based Kerberos authentication, OTP verification, biometric authentication and behavioral profiling, as well as many others. These applications may be implemented at least in part using authentication tokens, authentication servers and other types of cryptographic devices.

Figure 1:
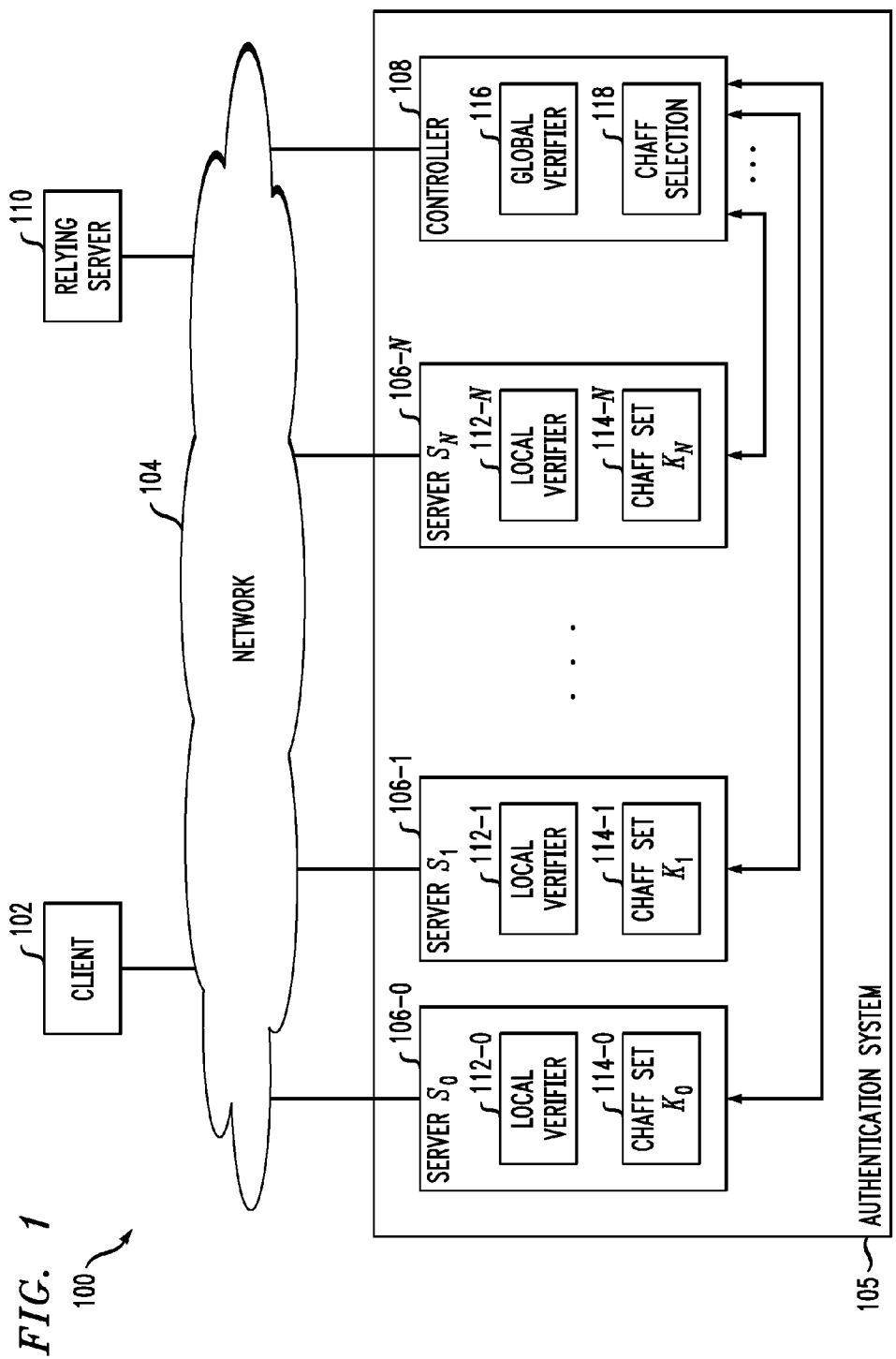
FIG. 1 is a block diagram of a communication system incorporating functionality for distributed cryptography using chaff sets in an illustrative embodiment of the invention.

FIG. 1 shows a communication system 100 that incorporates functionality for distributed cryptography using chaff sets in an illustrative embodiment. The system 100 comprises a client 102 that communicates over a network 104 with an authentication system 105. The authentication system 105 comprises a plurality of servers 106-0, 106-1, . . . 106-N coupled to a controller 108. It is assumed in the present embodiment that the client 102 is able to communicate over the network 104 with each of the servers 106 and the controller 108, although other arrangements can be used in other embodiments. For example, in some embodiments, communication between the client 102 and one or more of the servers 106 may flow through the controller 108.

The client 102 may comprise, for example, a mobile telephone, laptop computer, tablet computer or other user device having an associated hardware or software authentication token. In such an arrangement, the authentication token may comprise a time-synchronous authentication token such as an RSA SecurID® user authentication token. The client 102 may be associated with a particular user, where "user" as the term is applied herein should be generally construed so as to encompass a human user or an associated hardware or software entity. Numerous alternative arrangements are possible.

The network 104 may comprise, for example, a global computer network such as the Internet, a wide area network (WAN), a local area network (LAN), a satellite network a telephone or cable network a cellular network a wireless network such as WiFi or WiMAX, or various portions or combinations of these and other types of networks.

The servers 106-0, 106-1, . . . 106-N are also denoted in the figure as servers $S_0, S_1, \ldots S_N$, respectively. The controller 108 is configured to provide to the servers 106 respective ones of a plurality of value sets each including at least one secret value obscured within a distinct arrangement of other values. More particularly, in the present embodiment, the value sets are illustratively implemented as respective chaff sets $K_0, K_1, \ldots K_N$ stored on respective servers $S_0, S_1, \ldots S_N$. The term "value set" as used herein is therefore intended to be broadly construed so as to encompass not only exemplary chaff sets as disclosed herein but also other types of value sets in which one or more secret values are obscured within a given set using other values also in that set.

Also coupled to the network 104 in the present embodiment is a relying server 110 that relies on an authentication result produced by the controller 108 of the authentication system 105. In other embodiments, the relying server may instead be one or more of the servers 106, or another element of the authentication system 105.

The servers 106-0, 106-1, . . . 106-N comprise respective local verifiers 112-0, 112-1, . . . 112-N each configured to generate an indication as to whether or not a received input value corresponds to one of the values in its corresponding chaff set. The chaff sets $K_0, K_1, \ldots K_N$ are also denoted in the figure as respective chaff sets 114-0, 114-1, . . . 114-N and are assumed to be stored in respective memories of the servers 106.

The controller 108 comprises a global verifier 116 configured to authenticate the received input value based on the indications generated by at least a subset of the servers 106. The controller 108 also comprises a chaff selection module 118 that is configured to generate at least a portion of one or more of the chaff sets 114.

Although shown as being separate from the servers 106 in the present embodiment, the controller 108 in other embodiments may be implemented at least in part in one or more of the servers 106. It is also possible that at least a portion of the controller 108 may be implemented in another system element, such as the relying server 110. Thus, for example, the relying server 110 in other embodiments may implement at least the global verifier 116 of the controller 108, and may be considered part of the authentication system 105.

The client 102, servers 106, controller 108 and server 110 may be implemented as respective processing devices. A given such processing device may comprise, for example, a computer or other type of processing device configured to communicate with other such devices over the network 104. Each such processing device generally comprises at least one processor and an associated memory, and implements one or more functional modules for controlling certain features of the system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" storing executable computer program code.

Various elements of the system 100, such as the local verifiers 112 of the respective servers 106 and the global verifier 116 of the controller 108, may be implemented at least in part in the form of software that is stored in a memory of a processing device and executed by a processor of that processing device.

The system 100 in the present embodiment implements one or more processes for distributed cryptography using the chaff sets 114. Examples of such a process performed at least in part in conjunction with the client 102 authenticating to the authentication system 105 will be described below, but it should be understood that numerous other types of processes may be used in other embodiments.

The communication system 100 as shown in FIG. 1 is configured to allow a first cryptographic device in the form of client 102 to authenticate itself to at least a second cryptographic device such as the controller 108 or relying server 110. The term "cryptographic device" herein is intended to be broadly construed to encompass any device that participates in a cryptographic protocol with another device.

It is to be appreciated that the particular set of elements shown in FIG. 1 for providing distributed cryptography using chaff sets is presented by way of example, and in other embodiments additional or alternative elements may be used. Thus, another embodiment may include additional networks and additional sets of clients or servers.

As mentioned previously, various elements of system 100 such as clients, servers, controllers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be described in greater detail with reference to the flow diagram of FIG. 2, which illustrates a set of operations performed primarily by authentication system 105 in authenticating an input value received from client 102 in an illustrative embodiment.

The process as shown includes steps 200, 202 and 204, all of which are assumed to be performed by elements of the authentication system 105. It is to be appreciated that in other embodiments one or more such steps may be implemented at least in part by other system elements.

In step 200, servers $S_0, S_1, \ldots S_N$ store respective chaff sets $K_0, K_1, \ldots K_N$, with each chaff set including at least one secret value obscured within a distinct arrangement of other values. The chaff sets may be configured responsive to information provided by the chaff selection module 118 of controller 108. For example, the chaff sets may be configured such that each server is unaware of which of the values in its chaff set is the secret value. In such an arrangement, only the controller 108 is aware of which of the values in the chaff sets correspond to secret values. A given secret value may comprise at least a portion of a password, an OTP, a biometric template, a behavioral profile, or a transformed version thereof obtained using at least one of hashing and salting.

In some embodiments, the secret value comprises a common value which is the same for all of the chaff sets, with the common value being the only value that is present in more than one of the chaff sets.

As one example, the common value may comprise a secret key κ such that each of the chaff sets $K_i$ includes the secret key κ embedded within randomly generated chaff values. The randomly generated chaff values of the chaff set $K_i$ are designed to obscure the secret key κ within that chaff set. It should be noted that these and other references herein to random generation or selection are intended to be broadly construed so as to encompass suitable pseudorandom arrangements.

In embodiments in which there is a single secret key κ in each of the chaff sets, the chaff set $K_i$ comprises m+1 values including the secret key κ and m randomly generated chaff values. Accordingly, the chaff sets may each contain unique chaff values not repeated in more than one chaff set, such that $\cap_i K_i = \kappa$. In such an arrangement, a received input value κ' is accepted as a valid input value only if κ'=κ.

The presence of the chaff values in a given one of the chaff sets serves to obscure the secret value within that set. The corresponding server can identify the correct secret value κ within its chaff set $K_i$ only when κ is submitted during authentication by a valid user associated with client 102. Accordingly, the secret value κ is directly exposed to the servers only at the time that it is submitted by the valid user, and even an adversary that corrupts server $S_i$ and learns its chaff set $K_i$ does not learn κ. In order to impersonate client 102 successfully, the adversary must make multiple guessing attempts against $K_i$, which would typically be a detectable event.

It is also possible that there may be more than one secret key in each of the chaff sets. In embodiments of this type, there may be a specified number n of distinct secret keys $\kappa_1 \ldots \kappa_n$ in each of the chaff sets, with the chaff set $K_i$ comprising m+n values including the n secret keys $\kappa_1 \ldots \kappa_n$ interspersed with m randomly generated chaff values. Again, the chaff sets may each contain unique chaff values not repeated in more than one chaff set.

The chaff sets may be generated at least in part within corresponding respective ones of the servers. For example, the servers may be configured to construct their respective chaff sets based at least in part on share values exchanged between the servers. More detailed examples of such arrangements will be described elsewhere herein.

As indicated above, the chaff sets are generally configured so as to ensure that an adversary that corrupts a given one of the servers 106 and learns its corresponding chaff set does not thereby automatically learn the one or more secret values stored in that chaff set. This is considered an example of what is still more generally referred to herein as an arrangement in which one or more secret values are "obscured" by other values in a value set stored in a particular server.

In step 202, an input value submitted from client 102 is received in conjunction with an authentication process. The input value may comprise, for example, an OTP or other passcode submitted by the client 102, or a response submitted by the client 102 to a challenge issued in accordance with a challenge-response protocol.

In step 204, the received input value is authenticated based on indications received from respective ones of the servers $S_0$, $S_1, \ldots S_N$ as to whether or not the received input value corresponds to one of the values in their respective value sets $K_0, K_1, \ldots K_N$. For example, the received input value may be accepted as a valid input value only if a specified threshold number of the servers each indicates that the received input value corresponds to one of the values in the chaff set of that server. The specified threshold number of the servers may be all N of the servers $S_0, S_1, \ldots S_N$. Alternatively, the specified threshold number may be fewer than N but more than a single one of those servers.

A given one of the indications utilized in this step may be based on a determination by the corresponding server as to whether or not the received input value corresponds to the secret value in its associated chaff set. This determination may further involve, for example, determining if the secret value produces a valid decryption of an encrypted value previously generated using the secret value.

Figure 2:
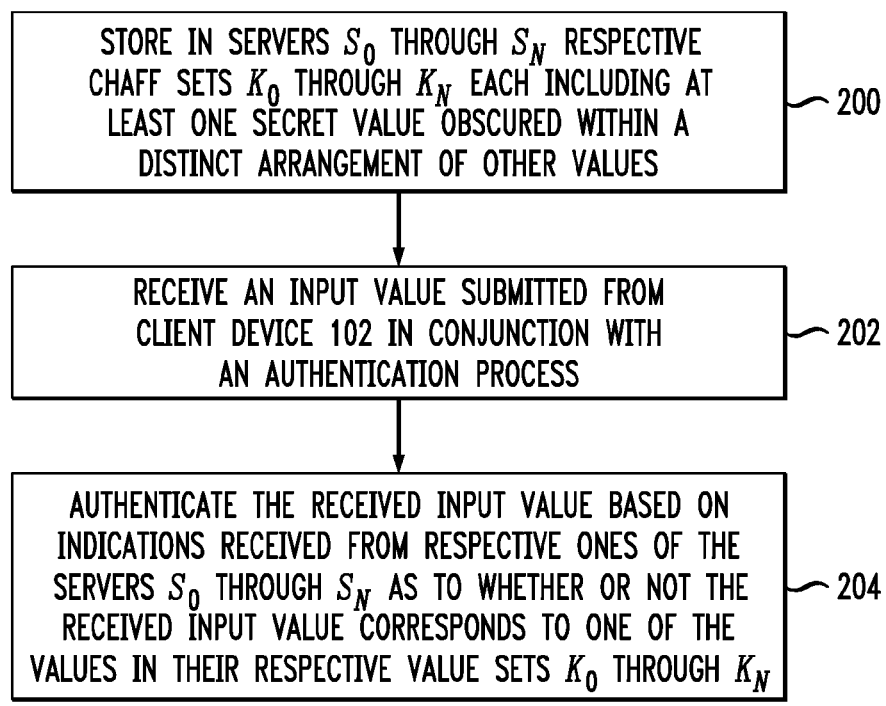
FIG. 2 is a flow diagram illustrating an exemplary distributed authentication process performed in the FIG. 1 system.

The particular processing operations and other system functionality described in conjunction with the flow diagram of FIG. 2 are presented by way of illustrative example only, and should not be construed as limiting the scope of the invention in any way. Alternative embodiments can use other types of processing operations for distributed cryptography using distinct chaff sets or other types of value sets. For example, the ordering of the process steps may be varied in other embodiments, or certain steps may be performed concurrently with one another rather than serially.

Additional details regarding the operation of embodiments of the invention will now be provided with reference to exemplary arrangements in which it is assumed for simplicity and clarity of illustration that there are only two servers $S_0$ and $S_1$. Those skilled in the art will recognize that the described two-server embodiments can be extended in a straightforward manner to other embodiments that include more than two servers.

It should also be appreciated that the particular features of the described two-server embodiments are presented by way of example only, and other embodiments need not incorporate these features.

In an initialization phase of operation of an exemplary two-server embodiment, chaff set $K_i$ is generated for server i, where for two servers i∈{0,1}. The chaff sets may be generated in the chaff selection module 118 of the controller 108, or possibly in the servers 106. Each of the two resulting chaff sets is assumed to contain a total of m+1 values, including a valid secret key κ obscured within m randomly generated chaff values. The same secret key κ is shared by the two servers, and can be any type of secret key suitable for use in an authentication process, such as a password, an OTP, a biometric template, etc.

In an authentication phase of operation of this exemplary two-server embodiment, for a given submitted authentication value κ', each server $S_i$ utilizes its local verifier 112-i to check whether κ'∈$K_i$. The authentication attempt is accepted by the global verifier 116 of controller 108 if both servers accept κ' as valid.

As mentioned previously, an adversary that compromises server i does not learn the secret key κ, but instead merely learns the chaff set $K_i$ containing κ. That is, the adversary learns m+1 candidate values for κ. To impersonate the user, the adversary must guess which of these m+1 values is the secret key κ.

If the adversary has corrupted $S_i$ while κ is submitted by the user, then of course the adversary learns κ. This vulnerability may be considered a tradeoff for the simplicity and efficiency of the authentication process.

An example of this two-server embodiment as implemented in a password authentication application will now be described. In this example, it is assumed that the servers $S_0$ and $S_1$ jointly check the correctness of a submitted password $\kappa'$ against registered password $\kappa$ from a lexicon L.

At initialization, two distinct bogus passwords $\kappa_0$ and $\kappa_1$ are selected at random from L. Then $S_0$ stores the chaff set $K_0=(\kappa,\kappa_0)$ in random order, while $S_1$ stores the chaff set $K_1=(\kappa,\kappa_1)$ In this example, m=1.

To verify the submitted password $\kappa'$, each server $S_i$ independently checks that $\kappa' \epsilon K_i$ using its local verifier 112-i. If both servers accept the submitted password $\kappa'$, then the global verifier 116 accepts the submitted password as valid.

Again, an adversary that ephemerally compromises only a single server, such as server $S_0$, learns only the corresponding pair $K_0=(\kappa,\kappa_0)$, but does not learn which value is correct. To impersonate the user, therefore, the adversary can at best select a random value from $K_0$, resulting in success probability ½.

In some embodiments, the goal of the authentication system 105 may be to authenticate a session established between a client C and a relying server S. These entities correspond to client 102 and relying server 110, respectively. The session is assumed to carry a unique identifier $\rho$. The pair of servers $(S_0,S_1)$ in arrangements of this type authenticates sessions on behalf of the relying server S. To authenticate, client C communicates individually with servers $S_0$ and $S_1$.

For purposes of further description, it may be assumed that there are ideal authenticated communication channels between the system entities such as client 102, servers 106, controller 108 and server 110. In practice, secure channels may be established using techniques such as secure sockets layer (SSL) or transport layer security (TLS). Such techniques are well known in the art and therefore not described in detail herein.

It is also assumed by way of example that an adversary A may statically compromise one of the two servers $S_0$ or $S_1$, but not C or S. The compromise may be ephemeral or persistent. Ephemeral compromise discloses the full state of a server $S_i$ at a given time. For example, it reveals a snapshot of the server memory, but does not disclose authentication session data. Persistent compromise means active corruption, that is, complete control of the state and behavior of the server. Also, it is assumed that the adversary A may block or delay message delivery, but cannot read or modify messages. The adversary A may be a mobile adversary that can ephemerally or persistently compromise at most one of the two servers in each of a plurality of time-based epochs. It should be understood that the above-described assumptions regarding the adversary are examples only, and other adversarial models may be used in characterizing embodiments of the invention.

Given the foregoing assumptions, an exemplary two-server authentication process implemented in system 100 may be described in greater detail as follows.

Let K be a keyspace encompassing all valid values of $\kappa$. Chaff sets $\{K_i\}$ are generated by a chaff-generation function setgen$(\kappa,m) \rightarrow (K_0,K_1)$, where $K_i \epsilon K^{m+1}$.

A server evaluates the correctness of a secret value SV via a verification function ver(SV,K)$\rightarrow$\{accept,reject\} that takes as input a verification value SV and chaff set K and determines whether there exists a key $\kappa' \epsilon K$ that corresponds to SV.

As a simple example, K might be a set of chaff passwords along with a real password. Then ver(SV,K) might just perform an equality test, checking whether SV$\epsilon$K.

In the initialization phase, the chaff-generation function setgen is run, yielding chaff sets $K_0$ and $K_1$. These are stored respectively on servers $S_0$ and $S_1$. In some embodiments, a trusted initializer such as chaff selection module 118 runs setgen, while in other embodiments it is run by $S_0$ and $S_1$ themselves.

In the authentication phase, an authentication value $\kappa'$ is presented for session identifier $\rho$. Server $S_i$ sends (ver($\kappa',K_i$), $\rho$) to S. Relying server S accepts authentication for session $\rho$ if both $S_0$ and $S_1$ output (accept,$\rho$). A server outputs at most one message (accept,$\rho$) per session identifier $\rho$.

Again, this particular authentication process is exemplary only, and other embodiments may utilize different types of functions, as well as different numbers of servers, different types of messaging, and so on.

As noted above, embodiments of the invention can be implemented in a wide variety of different cryptographic applications, including, for example, symmetric-key authentication applications such as password verification, password-based Kerberos authentication, OTP verification, biometric authentication and behavioral profiling. Examples of such embodiments will now be described in more detail.

Password Verification

In a password verification application, a user password P can be obscured in a chaff set $K_i$ that includes chaff passwords. In this case, protection is provided against ephemeral compromise by adversary A. The chaff passwords in the chaff set $K_i$ should generally be drawn from a probability distribution similar to that from which P is selected, although the latter distribution may be implicit.

As a simple example, if the chaff passwords in $K_0$ are random sequences of alphanumeric characters, while the true password P is an English word, an adversary that compromises $S_0$ can quickly identify P as the correct password based on its coming from a different lexicon than the chaff in $K_0$.

This issue can be addressed by transforming password P into a key $\kappa$ through the use of salting and hashing operations, such that an attacker requires non-negligible computational effort to extract P from $\kappa$. The use of two-server authentication amplifies this effort by a factor of m/2 on average for an attacker trying to derive P from a candidate set $K_i$. Even if an attacker can quickly determine whether a candidate password is viable, in that it is within a plausible lexicon, it still must perform the computational effort required to extract the password from a salted and hashed presentation.

As indicated above, it is important in password verification embodiments to render the chaff values more or less indistinguishable from legitimate passwords. In systems where passwords are randomly assigned to users, i.e., $P \epsilon_R L$, for some lexicon L, chaff generation may be straightforwardly achieved through random sampling of L. In this case, indistinguishability between chaff and legitimate passwords is perfect. To ensure against user mistyping of a password, it may be helpful to ensure a minimum edit distance between elements in a chaff set.

It is also possible that, within a given population of users $U=\{u_1, \ldots, u_m\}$, the password of one user can be used as a chaff value for other users. Such arrangements are referred to herein as "cross-user chaff." Let $P=\{p_1, \ldots, p_n\}$ denote the passwords associated with users in U, where $p_i$ is the password of user $u_i$. It should be noted that the variables m and i are used in a different sense in this context than in other contexts herein. A given user $u_i$ is assigned a subset of values in $P-\{p_i\}$ as chaff values. This assignment may be represented as a bipartite graph G in which each element of U is represented by a node on the left and each element of P by a node on the right. An edge $(u_i,p_j)$ of the bipartite graph G then denotes assignment of a password $p_j$ as a chaff value to the user $u_i$. The degree of $u_i$ denotes the size of the corresponding chaff set including the valid password for that user.

The bipartite graph G in this example serves as a convenient conceptual or operational representation of chaff sets. In order to render valid password edges of the form $(u_i, p_i)$ indistinguishable from chaff edges, it suffices to randomize the order of the nodes in P.

The above-described cross-user chaff example implicitly sets L=P, in that it takes the set of deployed passwords as the chaff lexicon.

This approach has the benefit of rendering chaff indistinguishable from valid passwords for an attacker with a priori knowledge about a given population of users. However, it does not render chaff indistinguishable for an attacker with a priori knowledge about sub-populations. For example, in a multinational corporation, users in one country may select passwords with a different linguistic basis than those in another. It may therefore be helpful to generate separate bipartite graphs for sub-populations of similar users. Sub-populations may be determined according to any of a range of demographic criteria, including native language, country of employment, function within an organization, etc.

As an alternative approach, it is possible to bias selection of the chaff associated with a given user toward users within the same sub-population. It is also possible to bias selection in this way with respect to more than one partitioning of a population. For example, a chaff-selection policy might require that every user have one chaff password drawn from another user based within the same country and another chaff password drawn from another user within the same functional group of the user's organization.

The above chaff password selection techniques are exemplary only, and in other embodiments alternative techniques can be used to select chaff passwords that are indistinguishable from actual user passwords.

Password-Based Kerberos Authentication

In a password-based Kerberos authentication application, a client typically authenticates to a service called a Key Distribution Center (KDC) by means of a secret such as a user password. Kerberos includes an optional, initial authentication flow known as pre-authentication. In this variant, a client initiates the authentication process by submitting to a KDC module known as an Authentication Service (AS) a ticket request AS-REQ of the form $SV=(c=enc_{\kappa_{user}}[\tau],\tau)$, where enc is a symmetric-key encryption function with corresponding user decryption function dec, c is a ciphertext generated using the encryption function enc, $\kappa_{user}$ is a user secret such as a hashed password P, and $\tau$ is a timestamp. The AS accepts the pre-authentication as valid if SV is correct with respect to stored secret $\kappa_{user}$ for the authenticating user.

A Kerberos embodiment of the invention can be implemented through a simple modification of the above-described verification function ver such that a user password is accepted as correct if it yields a valid decryption of SV. In particular, the modified verification function ver(SV,K) in such an embodiment outputs accept if and only if there exists a secret key $\kappa \in K$ such that $dec_\kappa[c]=\tau$. Again, as indicated above, c is a ciphertext generated using the encryption function enc.

More generally, in one or more Kerberos embodiments of the type described above, a server stores a value set including at least one secret value obscured within a distinct arrangement of other values, receives an input value containing a ciphertext, decrypts the ciphertext using at least one element of the value set, and transmits a value conditioned on the result of at least one such decryption to at least one other server. The received input value is authenticated based on indications from respective ones of the at least two servers.

In the example given previously, the hashed password $\kappa_{user}=h(P)$ is only revealed when submitted in conjunction with a valid pre-authentication. Otherwise, an ephemeral adversary learns only a set $K_i$ of m+1 possible user secrets.

Other stages of a full Kerberos authentication protocol are vulnerable to single-server compromise. Given the ability to modify the servers, however, it is straightforward to implement distributed verification of server-to-server transmissions without modifying Kerberos data formats. For example, session keys may be generated and verified using keys stored separately on the two servers.

OTP Verification

In an OTP verification application, a hardware or software authentication token typically generates single-use authentication values for verification by an authentication server. To permit human transcription, passcodes are typically generated using symmetric-key primitives. For example, at time t, a token computes a passcode of the form $P^{(t)}=f_\kappa[t]$ for a pseudorandom number generator $P^{(t)}$ and a key $\kappa$ often referred to as a "seed." The time t often assumes a one-minute granularity, although other granularities can be used.

An OTP verification embodiment of the invention can be implemented by modifying an otherwise conventional hardware or software authentication token such that passcodes are generated using two seeds instead of one, with the passcodes being of the form $P^{(t)}=f_{\kappa_0}[t]+f_{\kappa_1}[t]$. Verification of $P^{(t)}$ is distributed across the two servers $S_0$ and $S_1$ storing the respective seeds $\kappa_0$ and $\kappa_1$.

In some embodiments, minimum-knowledge, computationally secure protocols may be implemented in which servers reveal to one another only whether $P^{(t)}$ is correct, and no other non-negligible information.

In practice, however, such protocols may be impractical due to the challenges of time synchronization. Clock skew and other timing issues such as daylight savings time adjustments can result in perceived time differences between tokens and authentication servers. Consequently, a server will typically accept a submitted passcode P as valid if it falls within a "window" of passcodes $\{P_{t-w}, \ldots, P_{t-1}, P^{(t)}, P_{t+1}, \ldots, P_{t+w}\}$ for a parameter w, where the parameter w governs a tradeoff between security and system resilience to clock skew. In arrangements of this type, an authentication server must execute as many as 2w+1 verification operations. As w can be large, for example, larger than 60 to accommodate daylight savings time adjustments with one-minute granularity, this overhead can be considerable.

These time synchronization issues can be overcome in an embodiment that optimizes the verification function ver so that only a single symmetric-key operation is required per passcode verification corresponding to a given time increment t regardless of the size of m.

In this embodiment, the servers $S_0$ and $S_1$ construct chaff sets on the fly. For a given time t, each server $S_j$ can compute its respective share $P_i^{(t)}$, such that $P^{(t)}=P_0^{(t)}+P_1^{(t)}$. Rather than exchange their shares directly, the servers exchange share values that are used to define the chaff sets. Each server then checks whether a given submitted passcode P' lies within its respective chaff set.

Constructing chaff sets is challenging in this setting because the setgen function is computed in a distributed manner by $S_0$ and $S_1$, and not by a trusted initializer such as chaff selection module 118. In order to ensure a minimal false-accept rate, the two servers must compute chaff sets whose intersection is exactly $P^{(t)}$. Conversely, to ensure maximal security in the sense of minimal leakage of $P^{(t)}$ on server compromise, chaff sets must be as large as possible. It can be shown that, given these requirements, an optimal scheme implementation has $m+1=|K_0|=|K_1|=sqrt(|K|)$.

The modified setgen function in this embodiment will now be described. Let $\Sigma_0=\{\sigma_{0,0}, \ldots, \sigma_{0,m}\}$. The set $\Sigma_0$ is a fixed sequence of offsets that serves to construct chaff set $K_0$ of server $S_0$. The idea behind construction of $K_0$ is for server $S_1$ to construct a sequence of values that includes $P_1^{(t)}$. This sequence is centered on a random element $\sigma_{0,j}$ in $\Sigma_0$ and other elements of $\Sigma_0$ serve as offsets defining chaff values. By adding $P_0^{(t)}$ to each element of this set, $S_0$ obtains a chaff set $K_0$. Within $K_0$ is embedded the full, valid passcode $P^{(t)}$, along with chaff values.

The function setgen=(setgen$_0$,setgen$_1$) is defined as a pair of distinct chaff-generation functions, where setgen$_i$ ($\kappa_i$,m)→$K_i$. The first chaff-generation function setgen$_0$ includes the following steps:

1. Server $S_1$ selects an index $j_0 \in_R \mathbb{Z}_m$, computes $s_0$, and sends $s_0 = P_1^{(t)} - \sigma_{0,j_0}$ to server $S_0$.

2. Server $S_0$ constructs chaff set setgen$_0$(($s_0$,$P_0^{(t)}$), m)=$K_0$={$\sigma_{0,j}+s_0+P_0^{(t)}$}$_{j \in \mathbb{Z}_m}$.

The second chaff-generation function setgen$_1$ is configured in an analogous manner, based on a fixed set $\Sigma_1$.

The sets ($\Sigma_0$, $\Sigma_1$) are selected as $\Sigma_0 = \mathbb{Z}_m$ and $\Sigma_1$={m+1, 2(m+1), ..., (m+1)$^2$}, for m=$\sqrt{|K|}$-1. As noted above, it can be shown that this choice of ($\Sigma_0$, $\Sigma_1$) is optimal in the present embodiment, in the sense that in is of maximal size subject to the condition $K_0 \cap K_1 = P^{(t)}$. Accordingly, given the condition $K_0 \cap K_1 = P^{(t)}$ for setgen as defined above, m$\leq \sqrt{|K|}$-1.

In this embodiment, passcode $P^{(t)}$ is only directly exposed to either server if it is accepted as valid. As passcodes are one-time values, an exposed passcode $P^{(t)}$ cannot be used by a corrupted server to impersonate a user. Consequently, even a persistent adversary can at best mount an attack in which it seeks to guess a valid passcode from a chaff set, with success probability at most $1/(m+1) \approx \sqrt{|K|}$. In other words, a breach of one server halves the effective length of the passcodes.

Biometric Authentication

In a biometric authentication application, a user typically generates a template T in an enrollment phase, where T is a representation of a target biometric for the user. For example, in the case of fingerprint authentication, a template might comprise minutiae points, which are distinguished fingerprint features used for automated fingerprint verification. The template T is generally stored in the authentication system as a reference value for later user authentication. To authenticate, the user presents a fresh biometric representation T' to the system. In the above-noted fingerprint case, this is achieved by the user placing his or her finger on a reader that generate the representation T'. The authentication system compares T to T'. If the representations are sufficiently close according to a predefined metric, the authentication attempt is accepted, and otherwise is rejected.

This exemplary setting differs from those of certain embodiments previously described in that matching of stored value T and submitted value T' is approximate or "fuzzy." Nonetheless, a distributed approach using two servers $S_0$ and $S_1$ is applicable. Chaff values may be generated in this context in several different ways.

As one approach, T may be treated as an integral secret value, such that T=$\kappa$. Each server conceals $\kappa$ within a set of randomly selected, bogus templates drawn from a distribution L, again subject to the condition $K_0 \cap K_1 = \kappa$. L might be, for example, a database of fingerprints, real or synthetic.

As an alternative approach, a template T may be decomposed into a set of features $\kappa^{(0)}$, ..., $\kappa^{(q)}$. Chaff values may then take the form of additional, randomly selected features $\kappa^{(q+1)}$, ..., $\kappa^{(r)}$, for r>q. To determine whether a presented biometric T' is valid, then, server $S_i$ may determine whether features in T' are sufficiently close to a subset of those in $K_i$. Chaff value features are therefore constructed such that a large set of viable, bogus templates maps onto $K_i$. For example, if the target biometric is a fingerprint, the features of the template T may be minutiae points, and the chaff values would then be added in the form of additional, bogus minutiae points.

Behavioral Profiling

In a behavioral profiling application, contextual features relating to an authentication session or transaction serve as additional factors in an authentication decision. For example, a risk score for a user during an authentication attempt may be determined on the basis of features such as the time of day, the location of the user, etc. Access to a requested resource may be granted or denied, or further authentication steps may be requested of the user, based on the risk score.

As one example, an authentication module may be configured to maintain a set of cities C={$C_1$, ..., $C_k$} from which a given user typically authenticates. The cities may be determined, for example, based on originating IP addresses of the authentication attempts received from the given user. If the user attempts to authenticate from a city C$\in$C, the module outputs an accept indicator, and otherwise outputs a reject indicator. The output of the module may be incorporated into a multi-factor authentication decision of an authentication system that incorporates the module.

The set C may be split across servers $S_0$ and $S_1$ as follows. The chaff set $K_i$ is constructed as C plus a set of m chaff values such that $K_0 \cap K_1$=C. Chaff values are cities "similar" to those in C, such as, for example, with similar population sizes, located in the same countries, frequented by the same user population, etc.

As a refinement to this approach, confidence scores may be provided for respective cities in the set C with each such score indicating frequency of valid observed authentication attempts made from the corresponding city. The confidence scores may also be split between the servers in the manner described above. In this case, the output of a particular server may indicate a confidence score as well as an accept or reject determination, The foregoing applications and associated embodiments should be considered as illustrative only, and numerous other embodiments can be configured using the techniques disclosed herein, in a wide variety of different cryptography applications.

For example, as indicated previously, techniques described in the context of two servers can be extended in a straightforward manner to more than two servers. For example, illustrative (2,3)-thresholding embodiments using three servers $S_0$,$S_1$, and $S_2$ may be constructed straightforwardly by constructing sets $K_0$,$K_1$ and $K_2$ randomly over K such that $K_0 \cap K_1 \cap K_2 = \kappa$. In such embodiments, the threshold for successful authentication is at least two out of the three servers issuing accept decisions. Alternative thresholding arrangements may be utilized involving different numbers of servers and different threshold requirements. These can generally be described as ($N_{TH}$,N)-thresholding embodiments in which $N_{TH}$ denotes the threshold subset of the total number N of servers that are required for successful authentication, where $N_{TH} \leq N$.

As another example, the disclosed techniques can be configured to address exposure of static authentication values such as passwords and biometrics in conjunction with an authentication attempt. In one possible approach, a separate entity can be used to submit spurious authentication attempts. This entity can, for example, submit values selected uniformly at random from $K_0$. A limitation of this approach is that an adversary will observe the combined distribution of valid and spurious submissions, within which the key $\kappa$ corresponding to the correct secret value will be more frequent than randomly-generated chaff values. Consequently, to provide statistically effective concealment, spurious submissions must significantly outnumber valid ones.

As yet another example, rather than storing chaff set $K_i$ explicitly, server $S_i$ may split $K_i$ with another server or set of servers. Thus, in a two-server embodiment, $S_i$ could store a ciphertext on $K_i$ with the corresponding decryption key being stored on $S_{1-i}$. In this case, an adversary can only construct $K_i$ by triggering reconstruction of $K_i$ through an authentication attempt, which is likely to fail.

It should also be understood that distributed cryptographic functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments can advantageously eliminate situations in which a server or other distributed entity is exposed to potential compromise, while also avoiding the excessive bandwidth and computational requirements associated with security multiparty computation techniques. Also, a wide variety of different symmetric-key protocols can be implemented using the disclosed distributed cryptography techniques.

Symmetric-key authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
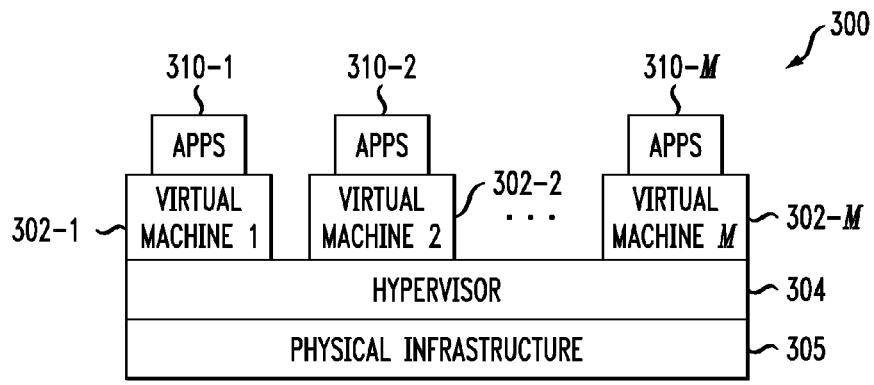
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, ... 302-M implemented using a hypervisor 304. The hypervisor 304 runs on physical infrastructure 305. The cloud infrastructure 300 further comprises sets of applications 310-1, 310-2, ... 310-M running on respective ones of the virtual machines 302-1, 302-2, ... 302-M under the control of the hypervisor 304.

The cloud infrastructure 300 may encompass the entire system 100 or only portions of that system, such as one or more of client 102, servers 106, controller 108 or relying server 110 in the system 100.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
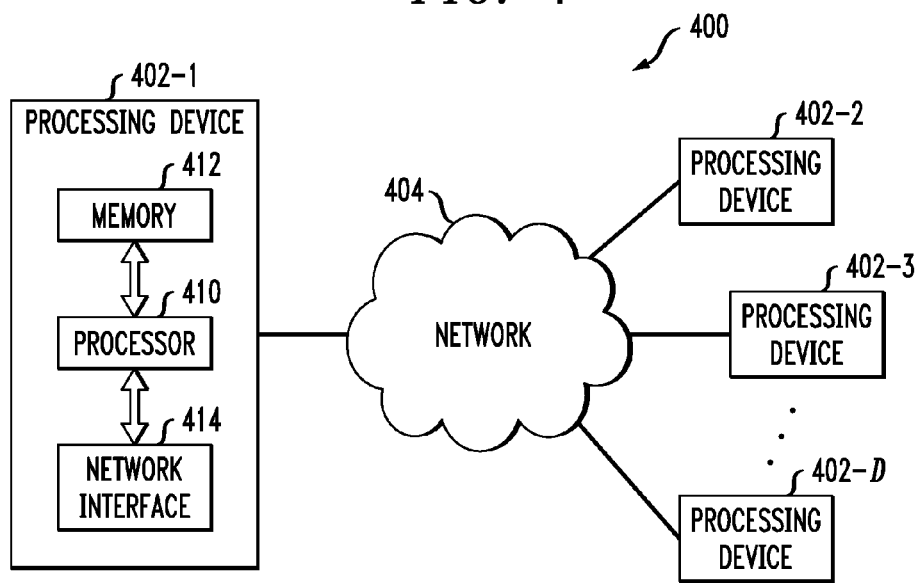

Another example of a processing platform is processing platform 400 shown in FIG. 4. The processing platform 400 in this embodiment comprises at least a portion of the system 100 and includes a plurality of processing devices, denoted 402-1, 402-2, 402-3, ... 402-D, which communicate with one another over a network 404. The network 404 may comprise any type of network, such as a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown in FIGS. 1-4, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   storing in a plurality of servers respective ones of a plurality of value sets each including at least one secret value obscured within a distinct arrangement of other values;

receiving an input value; and authenticating the received input value based on indications from respective ones of the servers as to whether or not the received input value corresponds to one of the values in their respective value sets;

wherein the secret value comprises a common value which is the same for all of the value sets;

wherein the other values in a given one of the value sets comprise respective chaff values configured to obscure said at least one secret value within the given value set; and wherein the common value comprises at least one secret key and the value sets comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

2. The method of claim 1 wherein storing in the plurality of servers respective ones of the plurality of value sets further comprises storing the value sets such that each server is unaware of which of the values in its value set is the secret value.

3. The method of claim 1 wherein the secret value comprises at least a portion of at least one of a password, a one-time passcode, a biometric template and a behavioral profile, or a transformed version thereof obtained using at least one of salting and hashing.

4. The method of claim 1 wherein the common value is the only value that is present in more than one of the value sets.

5. The method of claim 1 wherein each chaff set $K_i$ comprises m+n values including n secret keys $\kappa_1 \ldots \kappa_n$ and m randomly generated chaff values, where n is an integer greater than or equal to one.

6. The method of claim 5 wherein n=1 such that there is a single secret key $\kappa$ in each chaff set $K_i$ and further wherein the chaff sets each contain unique chaff values not repeated in more than one chaff set such that $\cap_i K_i = \kappa$.

7. The method of claim 1 wherein a given one of the indications utilized in said authenticating is based on a determination as to whether or not the received input value corresponds to the secret value in the associated value set, and wherein said determination further involves determining if the secret value produces a valid decryption of an encrypted value previously generated using the secret value.

8. The method of claim 1 wherein an adversary that corrupts a given one of the servers and learns its corresponding value set does not thereby automatically learn the secret value stored in that value set.

9. The method of claim 1 wherein authenticating the received input value based on indications from respective ones of the servers comprises accepting the received input value as a valid input value only if a specified threshold number of the servers each indicates that the received input value corresponds to one of the values in the value set of that server.

10. The method of claim 9 wherein the specified threshold number of the servers comprises all of the servers in the plurality of servers.

11. The method of claim 1 wherein at least a subset of the value sets are generated at least in part within corresponding respective ones of the servers.

12. The method of claim 11 wherein the servers construct their respective value sets based at least in part on share values exchanged between the servers.

13. The method of claim 12 wherein the servers include servers $S_0$ and $S_1$, which interact to generate respective chaff sets $K_0$ and $K_1$ as follows:

server $S_1$ selects an index $j_0 \epsilon_R Z_m$, computes $s_0 = P_1^{(t)} - \sigma_{0,j_0}$, and sends $s_0$ to server $S_0$;

server $S_0$ constructs chaff set $K_0 = \{\sigma_{0,j} + s_0 + P_0^{(t)}\}_{j \in Z_m}$;

server $S_0$ selects an index $j_1 \epsilon_R Z_m$, computes $s_1 = P_0^{(t)} - \sigma_{1,j_1}$, and sends $s_1$ to server $S_1$;

server $S_1$ constructs chaff set $K_1 = \{\sigma_{1,j} + s_1 + P_1^{(t)}\}_{j \in Z_m}$;

wherein:

$P^{(t)} = P_0^{(t)} + P_1^{(t)}$ is a secret value formed as a sum of secret values $P_0^{(t)}$ and $P_0^{(t)}$ in respective chaff sets $K_0$ and $K_1$;

$\Sigma_0 = \{\sigma_{0,0}, \ldots, \sigma_{0,m}\}$ is a fixed sequence of offsets used to construct chaff set $K_0$;

$\Sigma_1 = \{\sigma_{1,1}, \ldots, \sigma_{1,m}\}$ is a fixed sequence of offsets used to construct chaff set $K_1$; and $K_0 \cap K_1 = P^{(t)}$.

14. The method of claim 13 wherein $\Sigma_0 = Z_m$ and $\Sigma_1 = \{m+1, 2(m+1), \ldots, (m+1)^2\}$, for $m = \sqrt{|K|} - 1$.

15. The method of claim 1 wherein authenticating the received input value based on indications from respective ones of the servers comprises authenticating the received input value in an additional server separate from the servers that store the respective value sets.

16. A processing device comprising a processor coupled to a memory and configured to perform the method of claim 1.

17. A computer program product comprising a processor-readable storage medium having embodied therein one or more software programs, wherein the one or more software programs when executed by at least one processing device cause the method of claim 1 to be performed.

18. A method comprising:

storing in a first server a first value set including at least one secret value obscured within a distinct arrangement of other values;

receiving an input value; and generating an indication as to whether or not the received input value corresponds to one of the values in the stored first value set;

wherein the indication is utilizable in conjunction with corresponding indications generated by respective other servers to authenticate the received input value;

wherein the secret value comprises a common value which is the same for the first value set stored in the first server and for each of a plurality of other value sets stored in the respective other servers;

wherein the other values in the first value set comprise respective chaff values configured to obscure said at least one secret value within the first value set; and wherein the common value comprises at least one secret key and the first value set and other value sets comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

19. An apparatus comprising:

a first server comprising a memory and a local verifier;

the first server being configured to store in the memory a first value set including at least one secret value obscured within a distinct arrangement of other values;

the local verifier being configured to generate an indication as to whether or not a received input value corresponds to one of the values in the stored first value set;

wherein the indication is utilizable in conjunction with corresponding indications generated by respective other servers to authenticate the received input value;

wherein the secret value comprises a common value which is the same for the first value set stored in the first server and for each of a plurality of other value sets stored in the respective other servers;

wherein the other values in the first value set comprise respective chaff values configured to obscure said at least one secret value within the first value set; and wherein the common value comprises at least one secret key and the first value set and other value sets comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

20. A method comprising:

receiving an input value; and authenticating the received input value based on indications from respective ones of a plurality of servers as to whether or not the received input value corresponds to a value in respective value sets stored by those servers;

wherein the value sets each include at least one secret value obscured within a distinct arrangement of other values;

wherein the secret value comprises a common value which is the same for all of the value sets;

wherein the other values in a given one of the value sets comprise respective chaff values configured to obscure said at least one secret value within the given value set; and wherein the common value comprises at least one secret key and the value sets comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

21. An apparatus comprising:

a controller comprising a global verifier;

the global verifier being configured to authenticate the received input value based on indications from respective ones of a plurality of servers as to whether or not the received input value corresponds to a value in respective value sets stored by those servers;

wherein the value sets each include at least one secret value obscured within a distinct arrangement of other values;

wherein the secret value comprises a common value which is the same for all of the value sets;

wherein the other values in a given one of the value sets comprise respective chaff values configured to obscure said at least one secret value within the given value set; and wherein the common value comprises at least one secret key and the value sets comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

22. The apparatus of claim 21 wherein at least a portion of the controller is implemented in one or more of the servers.

23. The apparatus of claim 21 wherein at least a portion of the controller is implemented in a relying server that implements the global verifier.

24. An authentication system comprising:

a plurality of servers; and a controller associated with the servers;

wherein the controller is configured to provide to the plurality of servers respective ones of a plurality of value sets each including at least one secret value obscured within a distinct arrangement of other values;

each of the servers comprising a local verifier configured to generate an indication as to whether or not a received input value corresponds to one of the values in its value set;

the controller comprising a global verifier configured to authenticate the received input value based on the indications generated by at least a subset of the servers;

wherein the secret value comprises a common value which is the same for all of the value sets;

wherein the other values in a given one of the value sets comprise respective chaff values configured to obscure said at least one secret value within the given value set; and wherein the common value comprises at least one secret key and the value sets comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

25. A method comprising:

storing in a server a value set including at least one secret value obscured within a distinct arrangement of other values; and utilizing the value set in authenticating a received input value;

wherein the secret value included in the value set comprises a password of a given user and the other values included in the value set comprise respective passwords of other users;

wherein the given user and the other users comprise a population of users $U=\{u_1, \ldots, u_m\}$ having passwords $P=\{p_1, \ldots, p_m\}$ where password $p_i$ is the password of user $u_i$ and the value set for the user $u_i$ comprises password $p_i$ and a subset of passwords in $P-\{p_i\}$ as chaff values; and wherein the chaff values comprising the subset of passwords in $P-\{p_i\}$ that are part of the value set for the user $u_i$ are configured to obscure the password $p_i$ within that value set.

26. The method of claim 25 wherein assignment of chaff values to value sets of respective users is represented as a bipartite graph G in which each element of U corresponds to a node on one side of the graph and each element of P corresponds to a node on the other side of the graph, and a given edge $(u_i, p_j)$ of the bipartite graph G denotes assignment of a password $p_j$ as a chaff value to the user $u_i$.

27. A method comprising:

storing in a first server a value set including at least one secret value obscured within a distinct arrangement of other values;

receiving an input value containing a ciphertext;

decrypting said ciphertext using at least one element of the value set; and transmitting a value conditioned on a result of at least one such decryption to at least one other server;

wherein the received input value is authenticated based on indications from respective ones of the first server and the at least one other server;

wherein the secret value comprises a common value which is the same for the value set stored in the first server and for at least one other value set respectively stored in the at least one other server;

wherein the other values in the value set comprise respective chaff values configured to obscure said at least one secret value within the value set; and wherein the common value comprises at least one secret key and the value set stored in the first server and the at least one other value set comprise respective chaff sets, with each of the chaff sets including said at least one secret key embedded within randomly generated chaff values, and further wherein the randomly generated chaff values of a given one of the chaff sets are designed to obscure said at least one secret key within that given chaff set.

28. The method of claim 1 wherein storing in the plurality of servers respective ones of the plurality of value sets further comprises storing the value sets such that each server is unable to determine solely from its corresponding stored value set which of the values in that value set is the secret value.

29. The method of claim 20 wherein the value sets are stored in respective ones of the servers such that each server is unable to determine solely from its corresponding stored value set which of the values in that value set is the secret value.

30. A computer program product comprising a processor-readable storage medium having embodied therein one or more software programs, wherein the one or more software programs when executed by at least one processing device cause the method of claim 20 to be performed.

* * * * *